US010260551B2

United States Patent
Aguilar

(10) Patent No.: US 10,260,551 B2
(45) Date of Patent: Apr. 16, 2019

(54) SELF-ACTUATING LOCK NUT AND ASSEMBLIES

(71) Applicant: Albert Aguilar, Zapopan (MX)

(72) Inventor: Albert Aguilar, Zapopan (MX)

(*) Notice: Subject to any disclaimer, the term of this patent is extended or adjusted under 35 U.S.C. 154(b) by 166 days.

(21) Appl. No.: 15/582,056

(22) Filed: Apr. 28, 2017

(65) Prior Publication Data

US 2018/0313393 A1    Nov. 1, 2018

(51) Int. Cl.
*F16B 31/02* (2006.01)
*F16B 39/30* (2006.01)

(52) U.S. Cl.
CPC .............. *F16B 39/30* (2013.01); *F16B 31/02* (2013.01)

(58) Field of Classification Search
CPC ...... F16B 31/02; F16B 31/021; F16B 31/027; F16B 37/0864; F16B 35/06
USPC .................. 411/1, 5, 8, 9, 432, 384
See application file for complete search history.

(56) References Cited

U.S. PATENT DOCUMENTS

| | | | | |
|---|---|---|---|---|
| 3,237,507 A * | 3/1966 | Modrey | ............. | F16B 31/02 411/8 |
| 3,841,177 A * | 10/1974 | Watterback | ............. | F16B 31/02 411/1 |
| 5,066,180 A * | 11/1991 | Lang | ............. | F16B 37/044 411/103 |
| 5,688,088 A * | 11/1997 | Watterback | ............. | F16B 31/02 411/238 |
| 6,196,781 B1 * | 3/2001 | Yang | ............. | F16B 5/0233 411/384 |
| 6,302,633 B1 * | 10/2001 | Poe | ............. | F16B 5/0233 411/318 |
| 6,905,298 B1 * | 6/2005 | Haring | ............. | F16B 5/025 411/178 |

\* cited by examiner

*Primary Examiner* — Flemming Saether
(74) *Attorney, Agent, or Firm* — Joseph A. Fuchs; Greensfelder, Hemker & Gale, P.C.

(57) ABSTRACT

The present invention relates to an assembly of a self-locking hex head screw and a self-locking hex nut that use parallel screw threads of one or various types that lock against each other upon applying a torque. The resulting counteracting torque forces provided by the screw thread types are further enhanced by applying a physical lock using press fit surfaces on the nut and finally when a snap ring is deployed to that prevent these threads from prying loose later on.

20 Claims, 7 Drawing Sheets

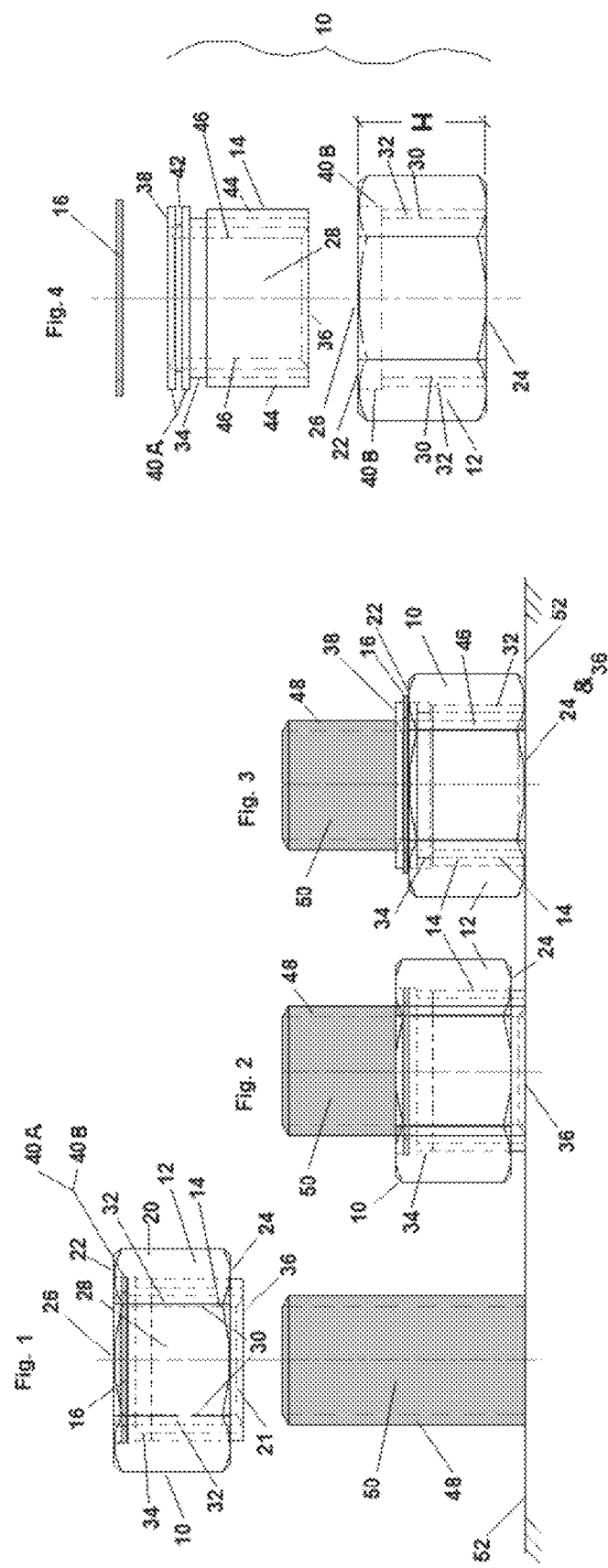

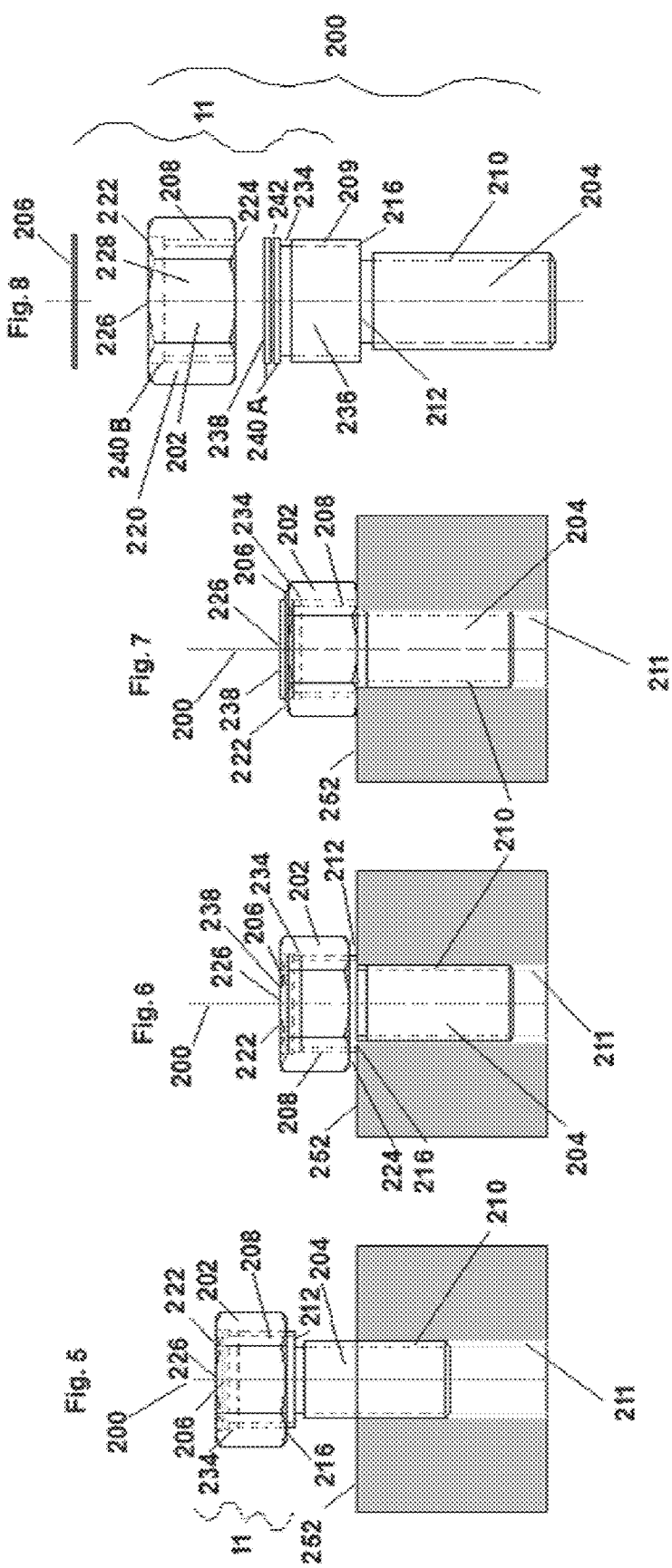

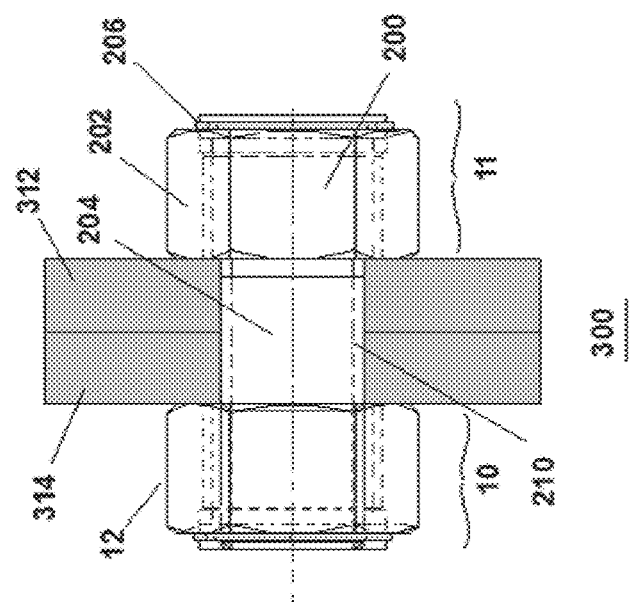
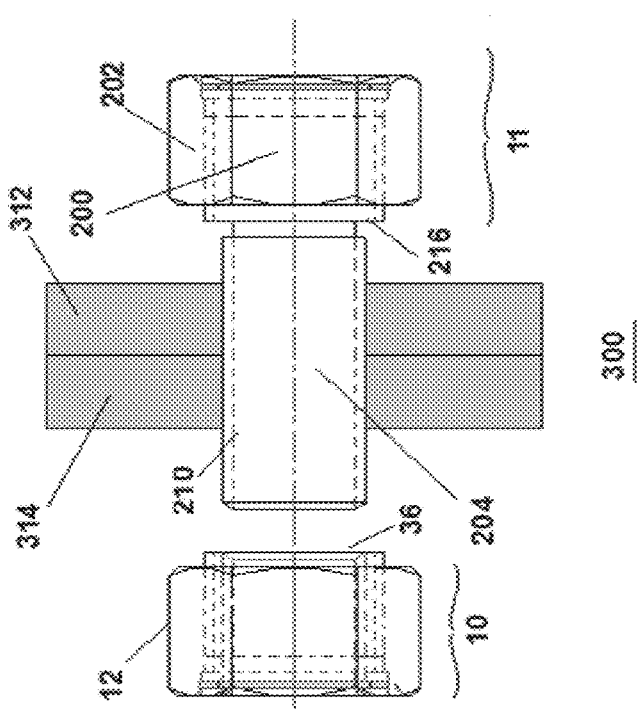

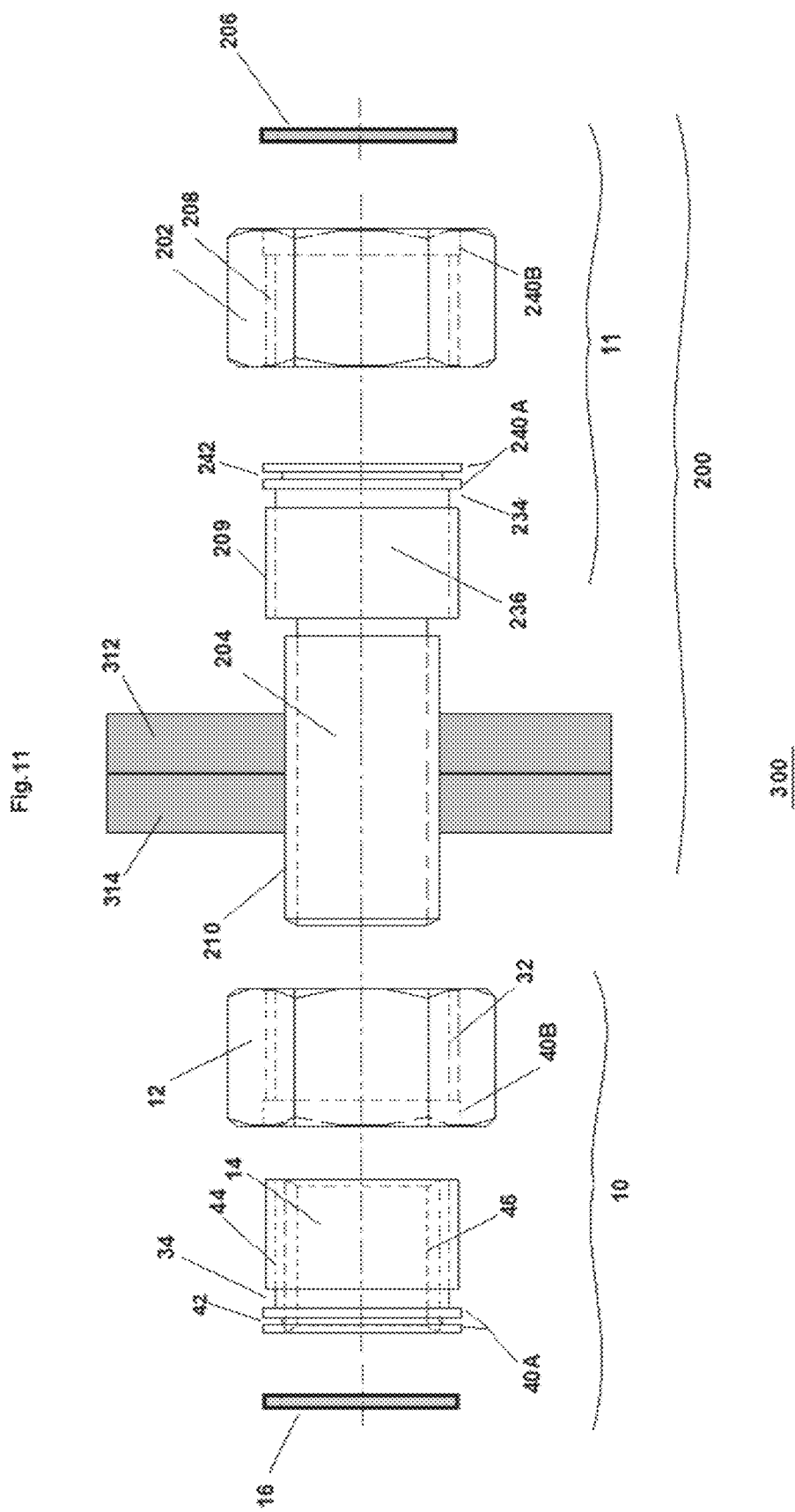

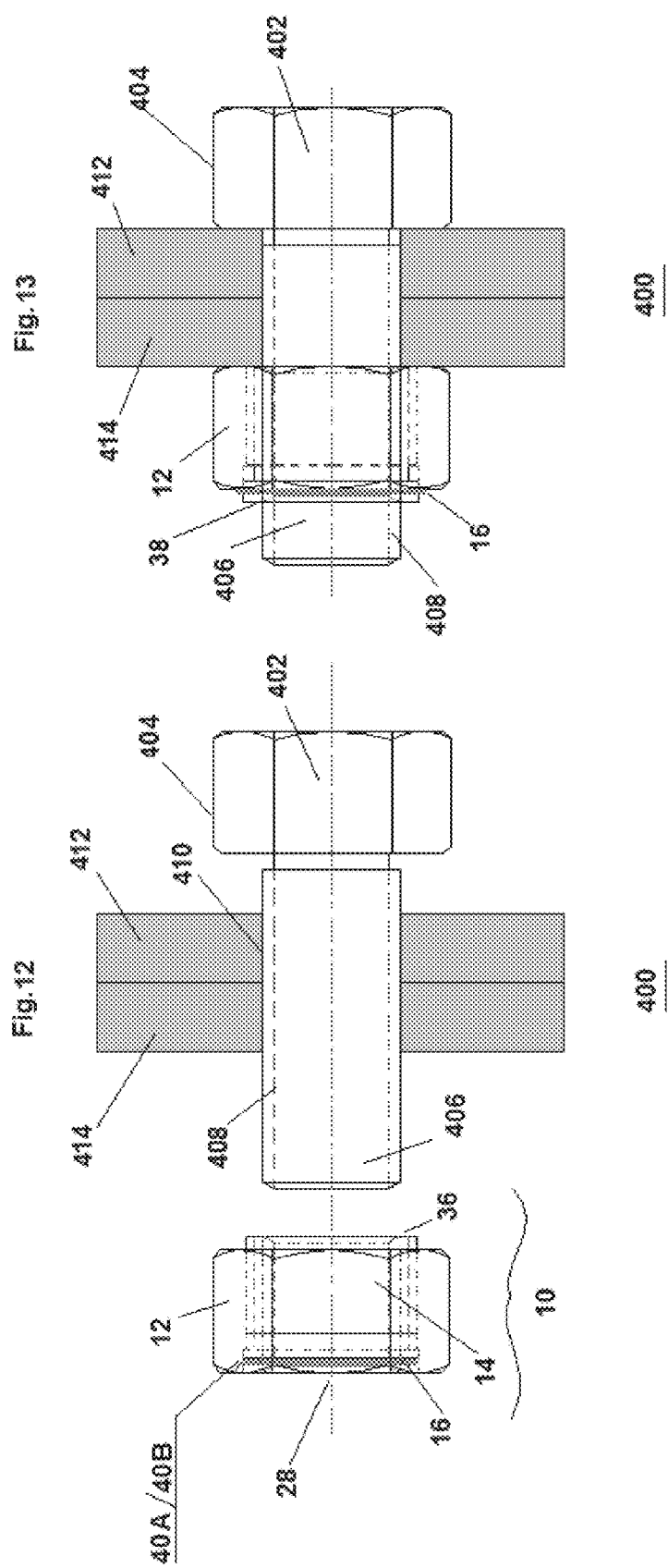

US 10,260,551 B2

SELF-ACTUATING LOCK NUT AND ASSEMBLIES

FIELD OF THE INVENTION

The present invention provides a self-locking hex nut assembly, a self-locking hex head screw and assemblies thereof.

BACKGROUND OF THE INVENTION

The present invention relates to an assembly of a self-locking hex head screw and a self-locking hex nut that use parallel screw threads of one or various types that lock against each other upon applying a torque. The resulting counteracting torque forces provided by the screw thread types are further enhanced secured in place by applying a physical lock using press fit surfaces on the nut and finally a snap ring that prevents these threads from prying loose. The assembly resembles a mechanism or machine-like action where three different phase actions take place in tandem to ensure a fixed lock. These rapid-to-install all-in-one, self-locking ABC Fasteners can be used without additional flat, tension or split washers as an assembly and can be used as individual parts as in the case of a single screw or a single nut. These ABC Fasteners can be used in a variety of industries and applications where vibration or fluids tends to loosen typical screws made of either fine or course threads.

SUMMARY OF THE INVENTION

The present invention provides a self-actuating lock nut having a hex nut having a top surface, a bottom surface, a height dimension, and a generally hexagonal shaped wall having a central opening into a first central lumen. The first central lumen has a first inner surface supporting a first set of threads and a non-threaded annular slot proximate the central opening. A cylindrical sleeve is disposed in the first central lumen and is moveable from a stowed position to a deployed position. The sleeve has a first end portion extending axially beyond the bottom surface when in the stowed position and an opposed second end portion extending axially beyond the top end when in a deployed position. The second end has an annular groove on an exterior surface, a second set of threads on an exterior surface, and a third set of threads on an inner surface. The second set of threads engage the first set of threads and require a first amount of torque applied about an axis of the first set of threads to cause relative rotation of the hex nut and the sleeve to move the sleeve from the stowed position to the deployed position. A snap ring is disposed in the annular groove and when the cylindrical sleeve is in the deployed position, the snap ring is in contact with the top surface. The third set of threads are for engaging a fourth set of threads on a separate body. A second amount of torque, less than the first amount of torque, is required to initiate co-rotation of the hex nut and the cylindrical sleeve about the fourth set of threads. The second amount of torque increases during co-rotation of the hex nut and the cylindrical sleeve until the amount of torque exceeds the first amount of torque causing relative rotation of the hex nut and the cylindrical sleeve to move the cylindrical sleeve to the deployed position.

The amount of torque increases during co-rotation when the second end portion contacts a surface. When the cylindrical sleeve is in the deployed position the hex nut is contained by causing the first set of threads to lock against the second set of threads via an increase in friction. This reaction between these sets of threads is transmitted to the third set of thread causing additional friction against the fourth set of threads. The first set of threads are UNF threads and the third set of threads are UNC threads.

The present invention further provides a fastener assembly having a first hex nut having a top surface, a bottom surface and a generally hexagonal shaped wall having a central opening into a first central lumen. The first central lumen having a first inner surface supporting a first set of threads and an annular slot proximate the central opening. A generally cylindrical sleeve defines a second central lumen and is coaxially disposed within the first central lumen and has an outer surface and a second inner surface. The outer surface supports a second set of threads engaged with the first set of threads. A third set of threads is supported on the second inner surface. The body has an annular groove at one end positioned in the annular slot when in a stowed position and moveable to a deployed position where a portion of the slot extends axially outward of the top surface. A first snap ring is disposed in the annular slot and when the cylindrical sleeve is in the deployed position the snap ring engages a top surface of the hex nut to resist relative rotation of the hex nut and the separate body.

The second amount of torque increases during co-rotation of the hex nut and the cylindrical sleeve until the amount of torque exceeds the first amount of torque causing relative rotation of the hex nut and the cylindrical sleeve to move the cylindrical sleeve to the deployed position. During co-rotation the opposed second end contacts a surface causing the amount of torque to increase.

The fastener assembly also has a shaft connected to the cylindrical sleeve. The shaft extends from the second end of the cylindrical sleeve opposite the first end. The shaft has an outer surface supporting a fifth set of threads and a second hex nut on the shaft with a second snap ring.

BRIEF DESCRIPTION OF THE DRAWINGS

To understand the present invention, it will now be described by way of example, with reference to the accompanying Figures in which:

FIG. 1 is a front elevation view of a self-actuating lock nut fastener positioned above a threaded rod.

FIG. 2 is a front elevation view of a self-actuating lock nut fastener engaged with a threaded rod with the fastener in a stowed position.

FIG. 3 is a front elevation view of a self-actuating lock nut fastener engaged with a threaded rod with the fastener in a deployed position.

FIG. 4 is an exploded view of a self-actuating lock nut fastener.

FIG. 5 is a front elevation view of a screw with a self-actuating lock nut fastener partially engaged in a threaded bore.

FIG. 6 is a front elevation view of a screw fully inserted into a threaded bore with a portion of an insert in the self-actuating lock nut fastener in contact with a surface and in a stowed position.

FIG. 7 is a front elevation view of a screw fully inserted into a threaded bore with a portion of an insert in the self-actuating lock nut fastener in contact with a surface and in a deployed position.

FIG. 8 is an exploded view of the screw of FIG. 5.

FIG. 9 is a side elevation view of the screw of FIG. 5 adjacent the self-actuating lock nut fastener of FIG. 1.

FIG. 10 is a side elevation view of an assembly of the screw of FIG. 5 engaged with the self-actuating lock nut fastener of FIG. 1 with both of the lock nuts in a deployed position.

FIG. 11 is an exploded view of the assembly of FIG. 10.

FIG. 12 is a side elevation view of a standard bolt adjacent the self-actuating lock nut fastener of FIG. 1.

FIG. 13 is a side elevation view of an assembly of a standard bolt and the self-actuating lock nut fastener of FIG. 1 in a deployed position.

DETAILED DESCRIPTION

Figure 14:
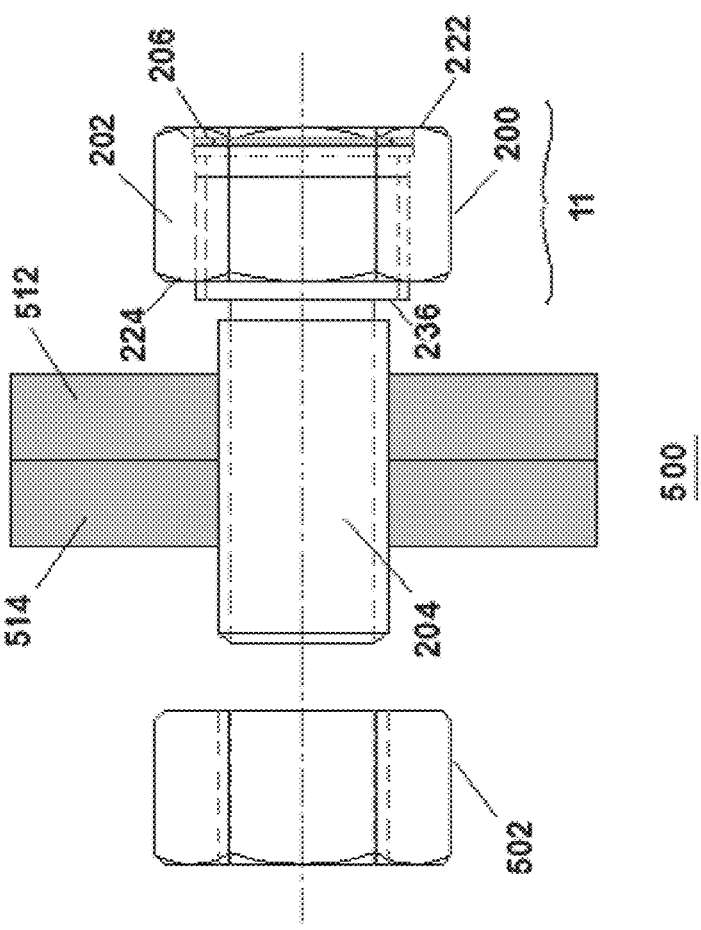
FIG. 14 is a side elevation view of a standard hex nut adjacent the screw of FIG. 5.

While this invention is susceptible of embodiment in many different forms, there is shown in the drawings, and will be described herein in detail, specific embodiments thereof with the understanding that the present disclosure is to be considered as an exemplification of the principles of the invention and is not intended to limit the invention to the specific embodiments illustrated.

FIGS. 1-4 show a self-actuating lock nut assembly 10 having a hex nut 12, a cylindrical sleeve 14, and a snap ring 16. The hex nut 12 has a generally hexagonal shaped wall 20 having a top surface 22, a bottom surface 24, a height dimension H (FIG. 4), and a central opening 26 into a first central lumen 28. The first central lumen 28 has a first inner surface 30 supporting a first set of threads 32 and a non-threaded annular slot 40B proximate the central opening and axially spaced from the first set of threads 32. The annular slot 40B has a greater diameter than the first set of threads 32.

The cylindrical sleeve 14 is coaxially disposed in the first central lumen 28 and is moveable from a stowed position (FIG. 2) to a deployed position (FIG. 3). The sleeve has a first end portion 36 extending axially beyond the bottom surface 24 when in the stowed position and an opposed second end portion 38 extending axially beyond the top surface 22 when in the deployed position. The second end 38 has a pair of axially spaced and radially extending flanges 40A defining an annular groove 42 therebetween to retain the snap ring 16. The cylindrical sleeve 14 has an exterior surface supporting a second set of threads 44 and a third set of threads 46 on an inner surface. The second set of threads 44 engage the first set of threads 32 and require a first amount of torque applied about an axis of the first set of threads 32 to cause relative rotation of the hex nut 12 and the sleeve 14 to move the sleeve 14 from the stowed position to the deployed position. The snap ring 16 is disposed in the annular groove 42 and when the cylindrical sleeve 14 is in the deployed position, the snap ring 16 is in contact with the top surface 22 (FIG. 3). FIG. 4 also shows a reduced diameter section 34 in the sleeve 14 and in the solid insert 11, discussed below, that separates the threaded portion to the 40A section. Without this space the second thread 44 could over run and cause a binding condition.

The third set of threads 46 are for engaging a fourth set of threads 48 on a separate body such as a threaded rod 50. The threaded rod 50 extends from a surface 52. FIGS. 1-3 show a sequence for using the self-actuating hex nut locking assembly with the threaded rod. The hex nut and sleeve assembly is threaded on the rod 50 by engagement of the third set of threads 46 with the fourth set of threads 48 by applying a first amount of torque to initiate co-rotation of the hex nut 12 and the cylindrical sleeve 14 about the fourth set of threads 48, until the first bottom end portion 36 of the sleeve 14 contacts the surface 52 as shown in FIG. 2. The torque required to continue co-rotation increases due to the pressed fit surfaces 40A on the sleeve 14 and surface 40B on the hex nut 12 each slowly prying loose under the still continuous torque to the point where the first set of threads 32 begins to move with respect to the second set of threads 44 when a second amount of torque is applied greater than the first amount of torque in a continuous fashion until the first bottom end portion 36 of the sleeve contacts the surface 52 (FIG. 2) and then until the hex nut 12 bottom 24 contacts the surface 52 as shown in FIG. 3. As the bottom surface 24 of the hex nut 12 contacts the surface 52 the second end of the sleeve 38 extends axially outward from the top surface 22 of the hex nut 12 as shown in FIG. 3 to define the deployed position. When in the deployed position, in a preferred form of the invention, the lock ring 16 is in surface contact with the top surface 22 of the hex nut 12, the snap ring 16 locks and resists further rotation of the hex nut assembly 10 with respect to the rod 50. This helps prevent the loosening of the hex nut assembly 10 due to vibrations or other environmental causes.

The first set of threads 32 and the second set of threads 44 are, for example, UNF (fine) threads and the third set of threads 46 and the fourth set of threads 48 are, for example, UNC (coarse) threads. The hex nut and screw of this invention coincides with standard ANSI hex screw and nut sizes to be used in conjunction with prior art tooling. Other compatible sets of threads can be used without departing from the scope of the present invention provided they function as required. That is, one pair of mating threads will rotate upon application of a first amount of torque to cause co-rotation of the hex nut assembly 10 with respect to the rod 50 and a second pair of threads require a second amount of torque greater than the first, as the pressed surfaces pry loose and allow the hex nut 12 to further descend axially downward, causing a relative rotation of two parts of the hex nut assembly 10.

FIGS. 5-8 show a screw 200 having a hex head lock nut assembly 202, a solid insert 204 and a snap ring 206. The hex head 202 has a fifth set of threads 208 on an interior surface. The solid insert has a sixth set of threads 209 on an exterior surface at one end engaging the fifth set of threads 208. In a preferred form of the invention, the fifth 208 and the sixth 209 set of threads co-rotate due to a press-fit engagement of flanged surfaces 40A and bore surface 40B. A seventh set of threads 210 are positioned on a second end of the insert 204 and are for engaging an eighth set of threads 211, such as the threaded bore 211 shown through a surface 252.

Similar to the hex nut assembly 10 described above, the hex head 202 has a generally hexagonal shaped wall 220 having a top surface 222, a bottom surface 224, and a central opening 226 into a first central lumen 228. The first central lumen 228 supports the fifth set of threads 208 and a non-threaded annular slot 234 proximate the central opening and axially spaced from the fifth set of threads 208. The annular slot 234 has a greater diameter than the fifth set of threads 208.

Also, similar to the cylindrical sleeve 14 described above, the solid insert 204 is coaxially disposed in the first central lumen 228 and is moveable from a stowed position (FIGS. 5 and 6) to a deployed position (FIG. 7). The solid insert 204 has a first end portion 236 extending axially beyond the bottom surface 224 when in the stowed position and an opposed second end portion 238 extending axially beyond the top surface 222 when in the deployed position. The second end 238 has a pair of axially spaced and radially extending flanges 240 defining an annular groove 242 therebetween to retain the snap ring 206.

As shown in FIGS. 5-7, the seventh set of threads 210 are placed in engagement with the eighth set of threads 211. By applying a first amount of torque to the hex head 202, the hex head 202 and the insert 204 co-rotate as the seventh set of threads 210 engage and move along the eighth set of threads 211 until the first end portion 212 of the insert 204 contacts the surface 252 as shown in FIG. 6. Further rotation causes the bottom surface 216 of the hex head 202 to contact the surface 252 until the second end 238 of the insert 204 extends axially outward from a top surface 222 of the hex nut 202 as shown in FIG. 7 to define the deployed position. When in the deployed position, in a preferred form of the invention, the lock ring 206 extends above the top surface 252, and more preferably, is in surface contact with the top surface 222 of the hex nut 202 to resist further rotation of the hex nut 202 with respect to the bore 208.

FIGS. 9-11 show an assembly 300 of the self-actuating lock nut assembly 10 described above with reference to FIGS. 1-4 and the screw assembly 200 described above with reference to FIGS. 5-8. FIG. 11 shows the assembly 300 in a fully disassembled state. FIG. 9 shows the assembly 300 with a portion of the screw inserted through a bore through two plates 312 and 314 prior to attachment of the assembly 10 to the assembly 200 with both assemblies in a stowed position. FIG. 10 shows the assembly 10 attached to the screw assembly 200 with both assemblies in a deployed position. Once the assembly 10 is initially threaded onto the bolt 204, either or both of the assemblies 10 or 200 can be rotated to move one or both of the assemblies into the deployed position. It is contemplated that one assembly will move into the deployed position before the other or both can move into the deployed position nearly simultaneously.

FIGS. 12 and 13 show an assembly 400 of the self-actuating lock nut assembly 10 with a prior art bolt 402. The prior art bolt 402 has a hex head 404 and a threaded shaft 406 having a ninth set of threads 408. The threaded shaft 406 extends through a bore 410 extending through plates 412 and 414. The self-actuating lock nut assembly 10 operates as described above where the lock nut assembly 10 is co-rotated about the shaft 406 and along threads 408 until a second amount of torque is required to cause relative rotation of the hex nut 12 and sleeve 14 into the deployed position shown in FIG. 13. It is also possible to rotate the prior art bolt 402 while holding the self-actuating lock nut assembly 10 from rotation to move the self-actuating lock nut assembly 10 into the deployed position. Both the prior art bolt 402 and the self-actuating lock nut assembly 10 can also be rotated at the same time to move the self-actuating lock nut assembly 10 into the deployed position to hold the plates 412 and 414 in face-to-face contact.

Figure 15:
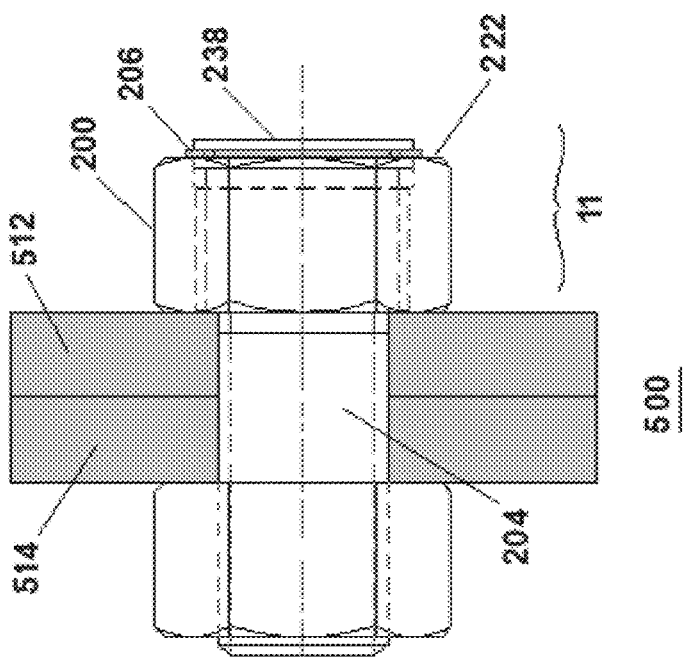
FIG. 15 is a side elevation view of an assembly of a standard hex nut engaged with the screw of FIG. 5 with the self-actuating lock nut fastener in a deployed position.

Similarly, FIGS. 14 and 15 show an assembly 500 of the screw assembly 200 with a prior art hex nut 502. Once the prior art hex nut 502 is threaded onto the seventh set of threads 210, either the prior art hex nut or the screw assembly 200 or both can be rotated with respect to one another to move the screw assembly 200 into the deployed position shown in FIG. 15 to hold plates 512 and 514 in face-to-face contact.

Figure 17:
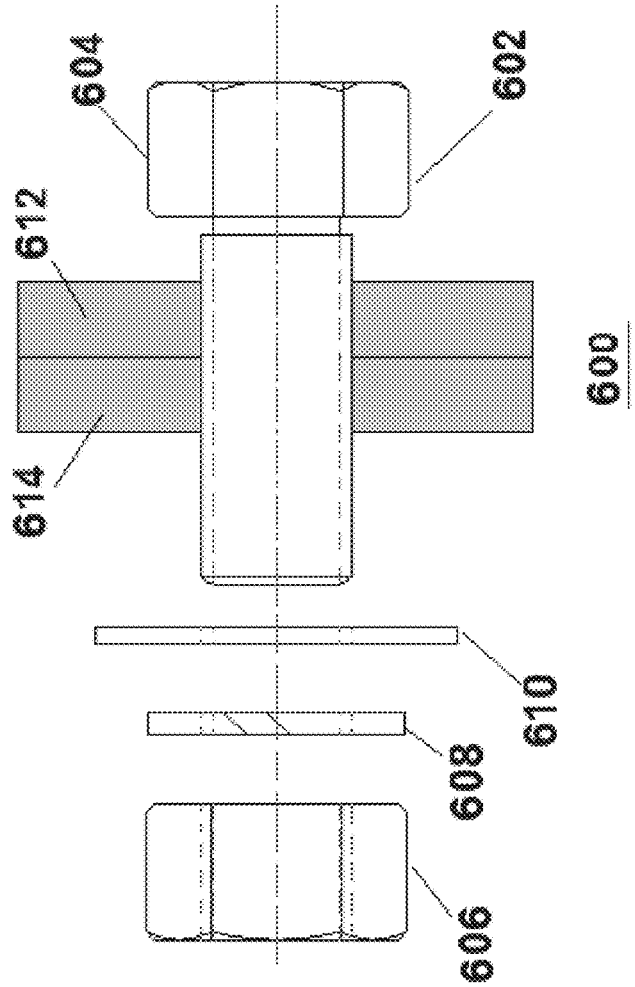
FIG. 17 is a side elevation view of the prior art assembly of FIG. 16 unassembled.
Figure 16:
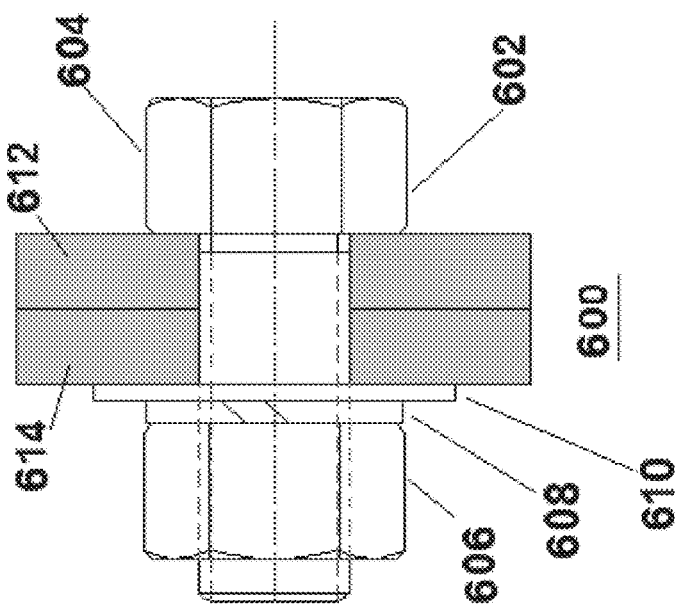
FIG. 16 is a side elevation view of a prior art hardware screw, spring washer, washer and hex nut assembly.

FIGS. 16 and 17 show a prior art bolt and nut assembly 600 for comparison purposes. The prior art assembly 600 has a prior art threaded bolt 602 with a hex head 604, a prior art hex nut 606, and a tension washer 608 necessary to bind the inherent torque in a locked position along with a flat washer 610 used to both distribute the binding force over a bigger diameter (area) and prevent the tension washer from marring the surfaces 614.

The parts described herein can be made of any suitable materials such as metals, metal alloys, polymeric materials and combinations of these materials. That is, the hex nut 12 can be fabricated from a metal and the sleeve can be fabricated from a polymeric material.

While the present invention is described in connection with what is presently considered to be the most practical and preferred embodiments, it should be appreciated that the invention is not limited to the disclosed embodiments, and is intended to cover various modifications and equivalent arrangements included within the spirit and scope of the claims. Modifications and variations in the present invention may be made without departing from the novel aspects of the invention as defined in the claims. The appended claims should be construed broadly and in a manner consistent with the spirit and the scope of the invention herein.

I claim:

1. A self-actuating lock nut comprising:
    a hex nut having a top surface, a bottom surface, a height dimension, and a generally hexagonal shaped wall having a central opening into a first central lumen, the first central lumen having a first inner surface supporting a first set of threads and a non-threaded annular slot proximate the central opening;
    a cylindrical sleeve in the first central lumen and moveable from a stowed position to a deployed position, the sleeve having a first end portion extending axially beyond the bottom surface when in the stowed position and an opposed second end portion extending axially beyond the top end when in a deployed position and having an annular groove on an exterior surface, a second set of threads on an exterior surface, and a third set of threads on an inner surface, the second set of threads engage the first set of threads and require a first amount of torque applied about an axis of the first set of threads to cause relative rotation of the hex nut and the sleeve to move the sleeve from the stowed position to the deployed position; and
    a snap ring in the annular groove and when the cylindrical sleeve is in the deployed position, the snap ring is in contact with the top surface.

2. The self-actuating lock nut of claim 1 wherein the third set of threads are for engaging a fourth set of threads on a separate body.

3. The self-actuating lock nut of claim 2 wherein a second amount of torque, less than the first amount of torque, is required to initiate co-rotation of the hex nut and the cylindrical sleeve about the fourth set of threads.

4. The self-actuating lock nut of claim 3 wherein the second amount of torque increases during co-rotation of the hex nut and the cylindrical sleeve until the amount of torque exceeds the first amount of torque causing relative rotation of the hex nut and the cylindrical sleeve to move the cylindrical sleeve to the deployed position.

5. The self-actuating lock nut of claim 4 wherein the amount of torque increases during co-rotation when the second end portion contacts a surface.

6. The self-actuating lock nut of claim 4 wherein when the cylindrical sleeve is in the deployed position the lock nut is in surface contact with the top surface to resist rotation of the hex nut.

7. The self-actuating lock nut of claim 1 wherein the first set of threads are UNF threads and the third set of threads are UNC threads.

8. The self-actuating lock nut of claim 1 wherein the annular groove is within the annular slot when the cylindrical sleeve is in the stowed position.

9. A fastener assembly comprising:
a first hex nut having a top surface, a bottom surface and a generally hexagonal shaped wall having a central opening into a first central lumen, the first central lumen having a first inner surface supporting a first set of threads and an annular slot proximate the central opening;
a generally cylindrical sleeve defining a second central lumen and coaxially disposed within the first central lumen and having an outer surface and a second inner surface, the outer surface supporting a second set of threads engaged with the first set of threads and a third set of threads supported on the second inner surface, the body having an annular groove at one end positioned in the annular slot when in a stowed position and moveable to a deployed position where a portion of the sleeve extends axially outward of the top surface; and
a first snap ring in the annular slot and when the insert is in the deployed position a portion of the snap ring extends beyond a top surface of the hex nut to resist relative rotation of the hex nut and the separate body.

10. The assembly of claim 9 wherein the first set of threads are UNF threads and the third set of threads are UNC threads.

11. The assembly of claim 9 wherein the first snap ring is compressed when in the stowed position.

12. The assembly of claim 9 wherein the separate body is a rod having an outer surface supporting the fourth set of threads.

13. The assembly of claim 9 wherein a first amount of torque must be applied about an axis of the first set of threads to cause relative rotation of the hex nut and the sleeve to move the sleeve from the stowed position to the deployed position.

14. The assembly of claim 13 wherein a second amount of torque, less than the first amount of torque, must be applied to the hex nut to initiate co-rotation of the of the hex nut and the cylindrical sleeve about the fourth set of threads.

15. The assembly of claim 14 wherein the second amount of torque increases during co-rotation of the hex nut and the cylindrical sleeve until the amount of torque exceeds the first amount of torque causing relative rotation of the hex nut and the cylindrical sleeve to move the cylindrical sleeve to the deployed position.

16. A self-actuating screw comprising:
a hex nut having a top surface, a bottom surface and a generally hexagonal shaped wall having a central opening into a central lumen, the central lumen having an inner surface supporting a first set of threads and an annular slot proximate the central opening;
a generally cylindrical insert having opposed ends and an outer surface, a pair of spaced flanges extend from the outer surface at the first end and define a gap therebetween, a second set of threads extend from the outer surface at an intermediate portion of the insert and engage the first set of threads, a third set of threads extends from the outer surface of the second end for engaging a fourth set of threads on a separate body;
a snap ring is positioned in the gap; and
wherein the insert is moveable from a stowed position to a deployed position by applying a first amount of torque to the hex nut to move the third set of threads with respect to the fourth set of threads and a second amount of torque greater than the first amount of torque to move the second set of threads with respect to the first set of threads.

17. The screw of claim 16 wherein when in the deployed position the snap ring extends axially beyond the top surface of the hex nut.

18. The screw of claim 16 wherein when in the stowed position the snap ring is positioned in the annular slot.

19. The screw of claim 16 wherein the first set of threads and the second set of threads co-rotate due to a separate surface press-fit engagement.

20. The screw of claim 16 wherein the hex nut and insert co-rotate upon application of the first amount of torque.

* * * * *